US010296910B1

(12) United States Patent
Templeton et al.

(10) Patent No.: US 10,296,910 B1
(45) Date of Patent: May 21, 2019

(54) PAY-BY-NAME PAYMENT CHECK-IN WITH A PAYMENT CARD

(71) Applicant: Square, Inc., San Francisco, CA (US)

(72) Inventors: Thomas Templeton, San Francisco, CA (US); Nathan Spindel, San Francisco, CA (US); Paul Aaron, San Francisco, CA (US); Jesse L. Dorogusker, Palo Alto, CA (US)

(73) Assignee: Square, Inc., San Francisco, CA (US)

( * ) Notice: Subject to any disclaimer, the term of this patent is extended or adjusted under 35 U.S.C. 154(b) by 862 days.

(21) Appl. No.: 14/455,220

(22) Filed: Aug. 8, 2014

(51) Int. Cl.
G06Q 20/40 (2012.01)
G06Q 20/20 (2012.01)
G06Q 20/34 (2012.01)
G06Q 20/32 (2012.01)

(52) U.S. Cl.
CPC ....... *G06Q 20/4014* (2013.01); *G06Q 20/202* (2013.01); *G06Q 20/3278* (2013.01); *G06Q 20/352* (2013.01)

(58) Field of Classification Search
None
See application file for complete search history.

(56) References Cited

U.S. PATENT DOCUMENTS

| 8,712,854 B1 | 4/2014 | Rafferty et al. |
| 8,972,298 B2 | 3/2015 | Kunz et al. |
| 9,092,767 B1 | 7/2015 | Andrews et al. |
| 2004/0138999 A1 | 7/2004 | Friedman et al. |
| 2008/0078831 A1 | 4/2008 | Johnson et al. |
| 2011/0180598 A1 | 7/2011 | Morgan et al. |
| 2011/0238510 A1 | 9/2011 | Rowen et al. |
| 2012/0209657 A1 | 8/2012 | Connolly |
| 2013/0117155 A1* | 5/2013 | Glasgo ............... G06Q 30/00 705/26.35 |
| 2013/0254227 A1* | 9/2013 | Shim ............... G06F 17/30241 707/769 |
| 2013/0256403 A1 | 10/2013 | MacKinnon |
| 2014/0159869 A1 | 6/2014 | Zumsteg et al. |

OTHER PUBLICATIONS

Non-Final Office Action dated Jan. 20, 2017, for U.S. Appl. No. 14/168,274, of Odawa, A.W., et al., filed Jan. 30, 2014.
U.S. Appl. No. 14/168,274 of Odawa, A. et al., filed Jan. 30, 2014.

(Continued)

*Primary Examiner* — Nathan C Uber
*Assistant Examiner* — Denisse Y Ortiz Roman
(74) *Attorney, Agent, or Firm* — Schott, P.C.

(57) ABSTRACT

A technique for providing a pay-by-name payment experience is disclosed. A point-of-sale (POS) system at a store receives information identifying an account with a central server from a payment card using a short-range wireless technology. In response to that, it obtains information regarding the account, including a person's name associated with the account, using the received information. It also accepts a name from a specific consumer in the vicinity. At this point, it determines whether the name accepted from the specific consumer and the name associated with the account are identical. If it determines that the two names are identical, it checks-in the consumer to the store.

12 Claims, 5 Drawing Sheets

(56) References Cited

OTHER PUBLICATIONS

U.S. Appl. No. 14/445,287 of Templeton, T. et al., filed Aug. 8, 2014.
U.S. Appl. No. 14/455,225 of Templeton, T. et al., filed Aug. 8, 2014.
Final Office Action dated May 19, 2017, for U.S. Appl. No. 14/168,274, of Odawa, A.W., et al., filed Jan. 30, 2014.
Non-Final Office Action dated Aug. 23, 2017, for U.S. Appl. No. 14/455,225, of Templeton, T., et al., 'filed Aug. 8, 2014.

* cited by examiner

PAY-BY-NAME PAYMENT CHECK-IN WITH A PAYMENT CARD

BACKGROUND

A customer today may use many types of cards to pay for goods and services, such as payment cards (e.g., credit cards, debit cards, prepaid gift cards, etc.), loyalty cards, identification cards, etc. Traditionally, when a customer is ready to make a purchase at a merchant's store, the customer walks up to a cash register, presents all the items to be purchased for scanning, receives a total price of all the items, decides on a method of payment, such as cash, credit card, or debit card, and pays the total price using the selected method of payment. Carrying and locating cards that may be used for payment can be inconvenient and tedious, as the cards can be in any of several locations, such as a pocket, a wallet, or a bag.

BRIEF DESCRIPTION OF THE DRAWINGS

Embodiments of the present invention will be described and explained through the use of the accompanying drawings in which.

DETAILED DESCRIPTION

Figure 1:
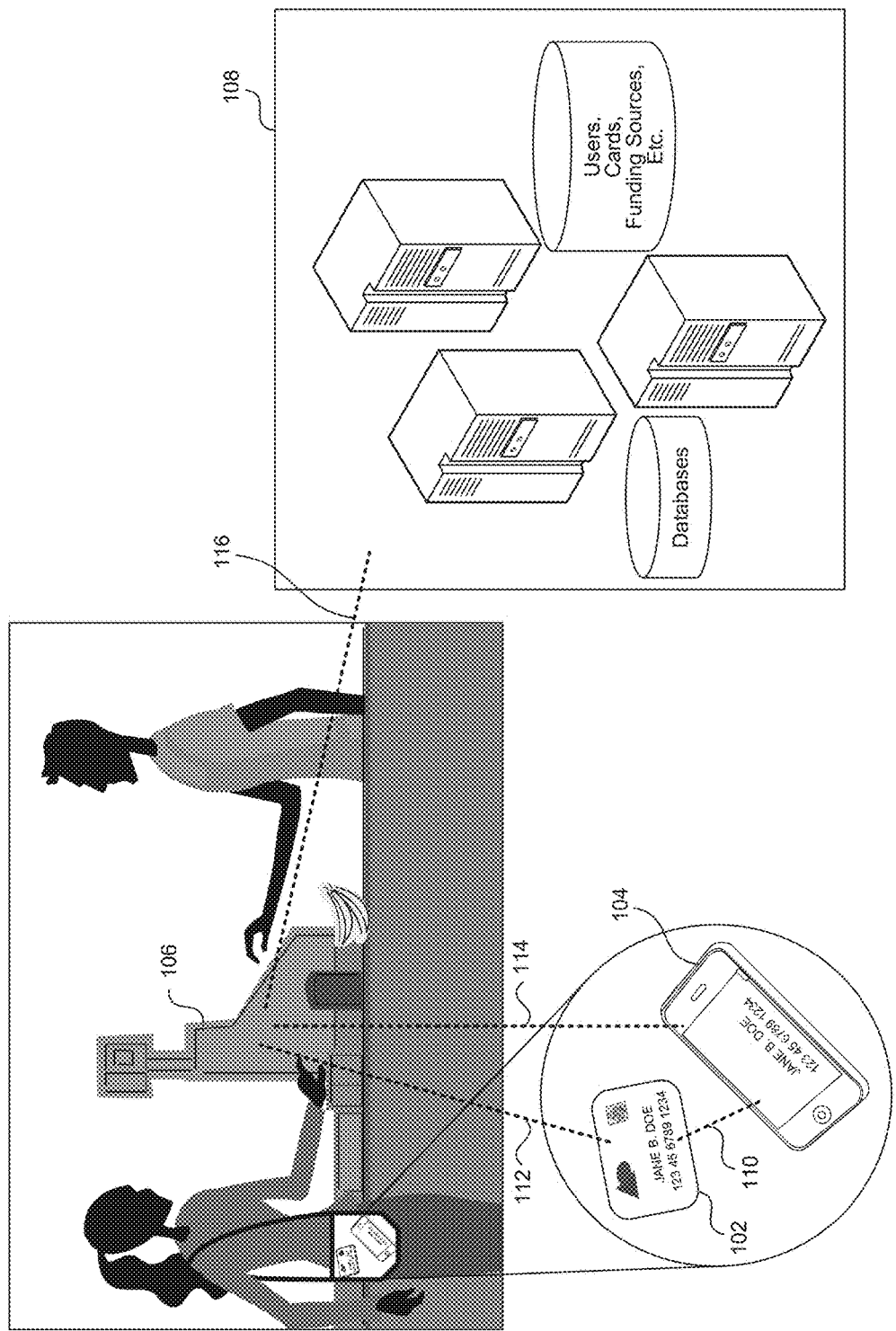
FIG. 1 illustrates an example of an environment in which a payment card, a mobile device and a point-of-sale (POS) system communicate with each other wirelessly to allow check-in of a consumer.

In this description, references to "an embodiment", "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments referred to also are not necessarily mutually exclusive.

Introduced here is a technique related to providing a pay-by-name payment experience using a payment card. A "payment card", as the term is used herein, is essentially identical or similar in appearance to a traditional credit or debit card; however, it includes a processor and memory capable of data processing functionality involving a service account on a server system, which manages service accounts that can be linked to other accounts corresponding to traditional payment cards. In addition, the payment card includes circuitry to carry out short-range (typically less than 100 meters) wireless communication. An example of the short-range wireless communication technology is Bluetooth Low Energy (BLE), which may accurately determine whether an item is within a close range. A "pay-by-name" payment experience is where a consumer can authorize and initiate a payment to a merchant simply by providing his name to the merchant. In the technique introduced here, the payment card makes the pay-by-name payment experience possible by communicating with a point-of-sale (POS) system of the merchant.

The technique is also related to providing a pay-by-name payment experience by using a mobile electronic device, such as a mobile phone or tablet computer, in conjunction with a payment card. Requiring the presence of the electronic device to be detected as a prerequisite to processing a transaction with the payment card helps to prevent a fraudulent transaction by an unauthorized consumer in the situation where the payment card has been stolen and thus is not near an electronic device of the consumer associated with the payment card.

In preparation for such a pay-by-name payment experience, a consumer can register with a server system that includes one or more servers and databases. The registration process may require the consumer to provide various types of information to establish an account, such as identification and demographic information, including the consumer's name, information regarding the consumer's credit card accounts, bank accounts and other funding sources, information regarding the consumer's shopping preferences, spending patterns, etc. The server system may then save the account information in databases.

After registering, the consumer receives a payment card that stores information identifying the consumer's account, such as an account number.

Additionally, a merchant may have a POS system, such as a register, in the merchant's store. The POS system also supports similar technologies for short-range location detection so that the POS system can communicate with the payment card. In addition, it may communicate with the server system using one of the network technologies, such as LAN, and the Internet.

Hence, in a pay-by-name payment experience provided using the technique disclosed in the present application, as the consumer carrying the payment card stands in front of a merchant's point-of-sale system for checkout, the POS system detects the presence of the payment card using one of the supported technologies for short-range location detection, and the payment card transmits the stored information identifying the consumer's account to the POS system.

The POS system then transmits the information received from the payment card to the server system and receives relevant information regarding the consumer's account in return, including the name associated with the consumer account. It then displays the received account information for the merchant's review.

In the meantime, the consumer gives (e.g., speaks) his or her name to the merchant, who inputs it to the POS system, which may then compare the given name with the name pulled up from the server system based on the information received from the payment card. When the two names are identical, the POS system then checks-in the consumer to the merchant's store, indicating that the consumer is present at the merchant's store, and allows the consumer to make purchases at the merchant's store. Specifically, it displays a confirmation of the consumer's checked-in status to the merchant and notifies the server system of such status. When the two names are different, the POS system prevents the consumer from making any purchase. For example, it may display an error indication to the merchant and similarly notify the server system of the error.

After the POS system checks-in the consumer, it proceeds to handle the consumer's intended purchase. When the information received from the server system includes information on the consumer's funding sources, it may process the consumer's payment directly. Otherwise, it may send information related to the intended purchase to the server system, which may then process the payment.

In this manner, the consumer may make purchases without ever having to look for or take out his payment card or any other payment card and only needs to speak his name to the merchant.

To improve the pay-by-name payment experience, after registration, the consumer may also download an application from the server system to one of the consumer's electronic devices, such as a mobile phone or a tablet. The electronic device similarly supports technologies for short-range location detection, as discussed above. As a result of downloading the application, the electronic device also stores information identifying the consumer's account. The electronic device may then cooperate with the payment card to provide additional security and processing intelligence.

Before communicating with the POS system, the payment card may attempt to detect the presence of the consumer's electronic device in the vicinity, using a technology for short-range location detection. Such detection prevents a situation where a stolen payment card is used by someone else. Upon detecting the presence of a specific electronic device in the vicinity, there are various ways in which the payment card and the specific electronic device may reach an agreement between them as to how they store information identifying the same consumer account with the server system. Subsequently, either of them may transmit the information identifying the consumer's account and a confirmation of both their presence to the POS system, using the technology for short-range location detection. Alternatively, the payment card may request the specific electronic device to transmit locally-stored information identifying a consumer's account to the POS system, after which the payment card also transmits locally-stored information identifying the consumer's account to the POS system, thereby relying on the POS system to confirm that the payment card and the specific electronic device store information identifying the same consumer account.

The determination of whether the consumer's electronic device is close to the payment card may also take place at selected or preconfigured times, such as when the POS system determines that the total price of the consumer's intended purchases exceeds a predetermined threshold, or when the consumer's intended purchases do not appear consistent with the consumer's usual spending pattern. In general, the POS system, instead of the payment card, may detect the presence of a specific electronic device and request that specific electronic device to transmit stored information identifying a consumer's account to the POS system.

Furthermore, the consumer's electronic device may perform additional security checks. For example, it requests information identifying the merchant from the POS system using the technology for short-range location detection. It then determines whether the current location is identical or close to the official location of the merchant. Such determination may prevent a situation where a POS system falsely purports to be that of a particular merchant. The consumer's electronic device may identify the current location using a built-in GPS feature and the official location of the merchant by a Web search, for example. When it determines that the current location is not substantially close to the official location, the POS system prevents the consumer from making any purchase.

In addition, when the POS system determines that both the payment card and the consumer's electronic device are nearby (which provides an added assurance of the authenticity of the consumer's identity and the legitimacy of the ensuing payment generally appreciated by a funding source, such as a credit company), it may report this determination to the funding source in order to receive a favorable rate for payment processing.

FIG. 1 illustrates an example of an environment in which a payment card, a mobile device and a point-of-sale (POS) system communicate with each other wirelessly to allow check-in of a consumer. In some embodiments, a consumer carries a payment card 102 and possibly an electronic device 104, such as a mobile phone (e.g., smartphone), a personal digital assistant, a tablet computer, a laptop computer, a camera, a smart watch, etc. Both the payment card and the electronic device support the same technology for short-range wireless communication, such as BLE, standard Bluetooth, WiFi, Near Field Communication (NFC) or Radio-Frequency Identification (RFID). In addition, both store information identifying an account of the consumer with a server system 108, which includes one or more servers and one or more databases containing details of the account. Both may also store the name of the consumer.

In a merchant's store, when the consumer is ready to pay for the consumer's intended purchases, the consumer approaches a POS system 106, such as a register attended by a cashier or a self-checkout machine, which also supports the same technology for short-range location detection discussed above. The POS system can communicate with the server system 108, and the communication channel 116 between them may be implemented by any known or convenient network technology or technologies, including, for example, the Internet. At this point, the payment card 102, the consumer's electronic device 104 and the POS system 106 detects the presence of one another, and they start communication. Each of the communication channels 110, between the payment card 102 and the consumer's electronic device 104, 114, between the consumer's electronic device 104 and the POS system 106, and 112, between the payment card 102 and the POS system 106, is implemented by one or more of known or convenient technologies for short-range location detection, such as BLE, WiFi, or infrared. The communication channel 114 may also be implemented by other network technologies, such as a cellular network technology.

In some embodiments, the payment card 102 sends locally-stored information identifying the consumer's account to the POS system 106. Upon receiving that information, the POS system 106 may retrieve information regarding the consumer's account, including a name associated with the consumer's account, from the server system 108. The POS system 106 may also have such information stored locally by periodic downloads from the server system 108 or previous on-demand downloads corresponding to visits made by the consumer to the merchant's store. In that case, the POS system 106 retrieves information regarding the consumer's account from local storage. The payment card may also send a locally-stored name to the POS system. In that case, the POS system does not need to contact the POS system. In some embodiments, the POS system 106 may display at least some of the account information to the merchant, who could be a cashier when the POS system 106 is a register.

In some embodiments, the consumer provides the merchant or the POS system 106 with the consumer's name, without having to look for or take out the payment card 102. When the consumer utters the name to the merchant, the merchant may input that name into the POS system 106, which then compares the consumer-provided name with the name pulled up based on the information received from the payment card 102. When the POS system 106 concludes that the two names match, the POS system 106 checks-in the consumer to the merchant's store and allows the consumer to make purchases at the merchant's store. Depending on the setting of the consumer's account, the consumer's checked-in status may be made available to other consumers for social networking purposes. The POS system 106 may display a message indicating that the two names match to the merchant and/or transmit the message to the server system 108. When the two names do not agree, the POS system 106 does not check-in the consumer to the merchant's store or allow the consumer to make purchases. The POS system 106 may display a message indicating that the two names do not match to the merchant, promoting the merchant to resolve this issue, which may be caused by reasons other than identity theft, such as a recent name change or an error in inputting consumer's account information. The POS system 106 may also transmit the message to the server system 108 or even alert local authorities.

In some embodiments, when the POS system 106 concludes that the consumer-provided name and the payment card-based name agree, it proceeds to handle the consumer's intended purchases. When the information received from the server system 108 includes information on one or more of the consumer's funding sources, the POS system 106 may display the list of funding sources and request a selection from the consumer. Upon receiving a selection, the POS system 106 processes the payment for the intended purchases with the selected funding sources. The POS system 106 then generates a receipt for the consumer. When the information received from the server system 108 does not include information on the consumer's funding sources, the POS system 106 transmits information related to the consumer's intended purchases, including a total amount, to the server system 108, which could then process the payment and return a receipt to the POS system 106.

In some embodiments, upon detecting the presence of the POS system 106, the payment card 102 first determines whether it can detect or has also detected the presence of the consumer's electronic device 104 and only allow the consumer to make purchases at the merchant's store when it finds the consumer's electronic device 104 nearby. When the payment card 102 concludes that the electronic device 104 is in the proximity, the payment card 102 may then transmit locally-stored information (i.e., information stored in the memory on the card) identifying the consumer's account and possibly a name to the POS system 106. The payment card 102 may inform the POS system 106 of the presence of the consumer's electronic device 104, or the POS system 106 may detect that presence directly. As a result, the POS system 106 may then request the consumer's electronic device 104 to send the locally stored information identifying the consumer's account. Alternatively, upon determining that the consumer's electronic device 104 is in the vicinity, the payment card 102 may request the consumer's electronic device 104 to send the stored information identifying the consumer's account to the POS system 106.

The payment card 102 or the POS system 106 may detect the presence of a specific electronic device which may or may not belong to the consumer and may or may not be able to respond to a request to send stored information identifying an account of a consumer to the POS system 106. For example, a consumer may not have downloaded an application from the server system 108 to the specific electronic device, or the device may not have the application running. Therefore, in some embodiments, either the payment card 102 or the POS system 106 may conclude that the specific electronic device is not of interest when it receives no response from that specific electronic device within a predetermined period of time.

In some embodiments, instead of, or in addition to, requiring the presence the consumer's electronic device 104 before checking-in the consumer, the POS system 106 may also attempt to confirm the presence of the consumer's electronic device 104 at later points in time. One example of such a point in time is when the total price of the consumer's intended purchases exceeds a predetermined threshold. Another example of such a point in time is when the consumer's intended purchases are inconsistent with the consumer's usual spending patterns.

In some embodiments, the consumer's electronic device 104 requests the POS system 106 to send information regarding the merchant before sending stored information identifying the consumer's account to the POS system 106. Alternatively, the payment card 102 requests the POS system 106 to send that information and forward the received information to the consumer's electronic device 104. The electronic device may then determine whether the current location is identical or close to the official location of the merchant. It may identify the current location using a built-in GPS feature, for example. Using the information received from the POS system, the consumer's electronic device 104 may obtain the official location of the merchant by contacting the server system 108, searching the web, or through other means. When it determines that the two locations substantially coincide, the consumer's electronic device 104 allows the consumer to make purchases at the merchant's store. Otherwise, the consumer's electronic device 104 may prevent the consumer from making purchases. For example, the consumer's electronic device 104 may send an error notification to the server system 108 to stop the server system 108 from sending account information to the POS system 106 or processing any payment for the intended purchase. It may also display an error indication to the consumer and request that the consumer take certain actions.

In some embodiments, upon receiving one piece of information from the payment card 102 and one piece of information from the consumer's electronic device 104, the POS system 106 determines whether the two pieces of information are identical, without knowing that the payment card 102 and the consumer's electronic device 104 necessarily belong to the same consumer. In the case where the electronic device that sends information to the POS system 106 belongs to another consumer, the POS system 106 concludes that the two pieces of information are not identical. Furthermore, upon concluding that the pieces of information received from the payment card 102 and the consumer's electronic device 104 are identical and thus associated with the same consumer account, the POS system may check-in the consumer to the merchant's store and allow the consumer to make purchases at the merchant's store.

In some embodiments, upon detecting that both the payment card 102 and the electronic device 104 are in the vicinity, the POS system 106 notifies the consumer's intended funding source to receive a credit on payment processing. The POS system 106 may do so directly after receiving information on the consumer's funding sources. It may also request the server system 108 to send a notification to the consumer's intended funding source.

Figure 2:
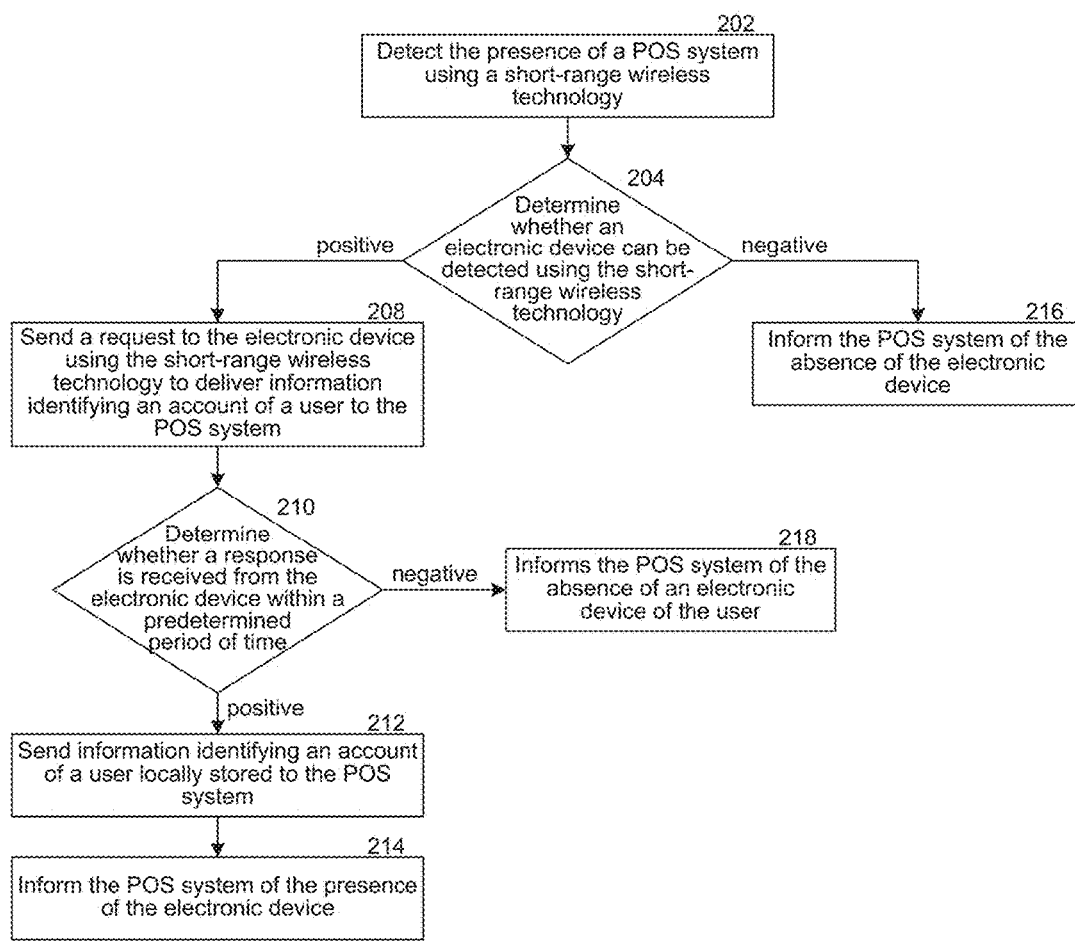
FIG. 2 is a flow diagram illustrating an example process of a pay-by-name purchase performed by a payment card, which supports a short-range wireless technology and stores information identifying an account of a consumer with a server system.

FIG. 2 is a flow diagram illustrating an example of a consumer check-in process performed by a payment card, which supports a short-range wireless technology, such as BLE, and stores information identifying an account of a consumer with a server system, such as an account number. In step 202, the payment card detects the presence of a POS system in the vicinity using the short-range wireless technology. Since the detected presence may indicate that the consumer intends to pay for the consumer's intended purchases, in step 204, the payment card also attempts to detect the presence of an electronic device of the consumer using the short-range wireless technology. The electronic device could be a mobile phone, a tablet, a laptop, a personal digital assistant, a wearable device, such as a smart watch, and so on that the consumer may typically carry. Requiring the presence of such an electronic device to be detected as a prerequisite to processing a transaction with the payment card helps to prevent a fraudulent transaction by an unauthorized consumer in the situation where the payment card has been stolen and thus is not near an electronic device of the consumer associated with the payment card.

When the payment card detects the presence of an electronic device in the vicinity, it means that the electronic device also supports the short-range wireless technology. However, it is still possible that the electronic device is not running an application that manages information regarding an account of a consumer with the server system. It is also possible that the electronic device does not have such an application installed and thus does not store any information regarding an account of any consumer with the server system. Therefore, in step 208, the payment card sends a request using the short-range wireless technology to that electronic device to deliver to the POS system any information stored by the electronic device that identifies an account of a consumer with the server system. Then, in step 210, the payment card determines whether it receives a response from the electronic device within a predetermined period of time. When it receives a response within a predetermined period of time, which confirms the delivery of information stored on the electronic device identifying an account of a consumer with the server system, in step 212, the payment card sends information it has locally stored identifying the account of the consumer to the POS system, which is then expected to reconcile this information with the information received from the electronic device. In addition, in step 214, the payment card informs the POS system of the presence of the electronic device in the vicinity as a heads-up.

When it does not receive a response within a predetermined period of time, in step 218, the payment card informs the POS system of the absence of an electronic device of the consumer. When it does not detect a presence of an electronic device in the vicinity, in step 216, the payment card similarly informs the POS system of the absence of an electronic device of the consumer.

Figure 3:
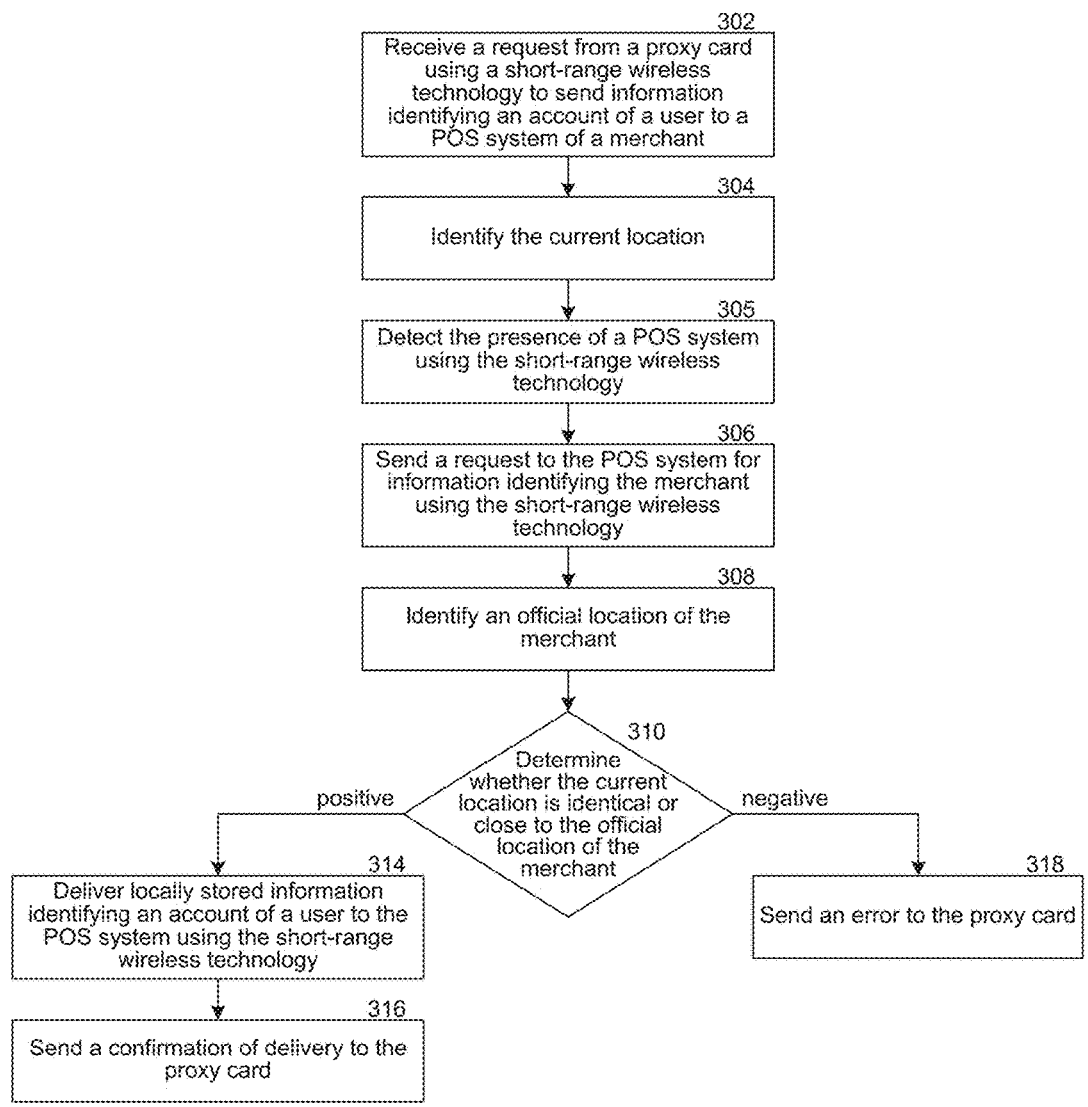
FIG. 3 is a flow diagram illustrating an example process of a pay-by-name purchase performed by an electronic device, which supports a short-range wireless technology and stores information identifying an account of a consumer with a server system.

FIG. 3 is a flow diagram illustrating an example process of a consumer check-in process performed by an electronic device of a consumer or a holder of a payment card, which supports a short-range wireless technology and stores information identifying an account of a consumer with a server system. This process may be used in conjunction with the process in FIG. 2. In step 302, the electronic device receives a request, using the short-range wireless technology from a payment card, to send locally-stored information identifying an account of a consumer with a server system to a POS system of a merchant. In step 304, the electronic device identifies the current location, using a built-in GPS feature, for example. In step 305, the electronic device detects the presence of the POS system in the vicinity using the short-range wireless technology. In step 306, the electronic device sends a request to the POS system using the short-range wireless technology for information identifying the merchant. In step 308, the electronic device identifies an official location of the merchant using the information received from the POS system. It may do so by contacting the server system, which may have complete information regarding the merchant, by visiting the merchant's official website, etc.

In step 310, the electronic device determines whether the identified current location is sufficiently close to the identified official location of the merchant. When it determines the that the two locations are sufficiently close which is an indication that the POS system is associated with the merchant, in step 314, the electronic device delivers locally-stored information (i.e., information stored in memory in the electronic device) identifying the account of the consumer to the POS system using the short-range wireless technology in response to the request received from the payment card. In step 316, the electronic device also sends a confirmation of delivery to the payment card. When it determines that the two locations are not sufficiently close, which is an indication that the POS system is not associated with the merchant, in step 318, the electronic device sends an error notification to the payment card to help avoid a possible scam.

Figure 4:
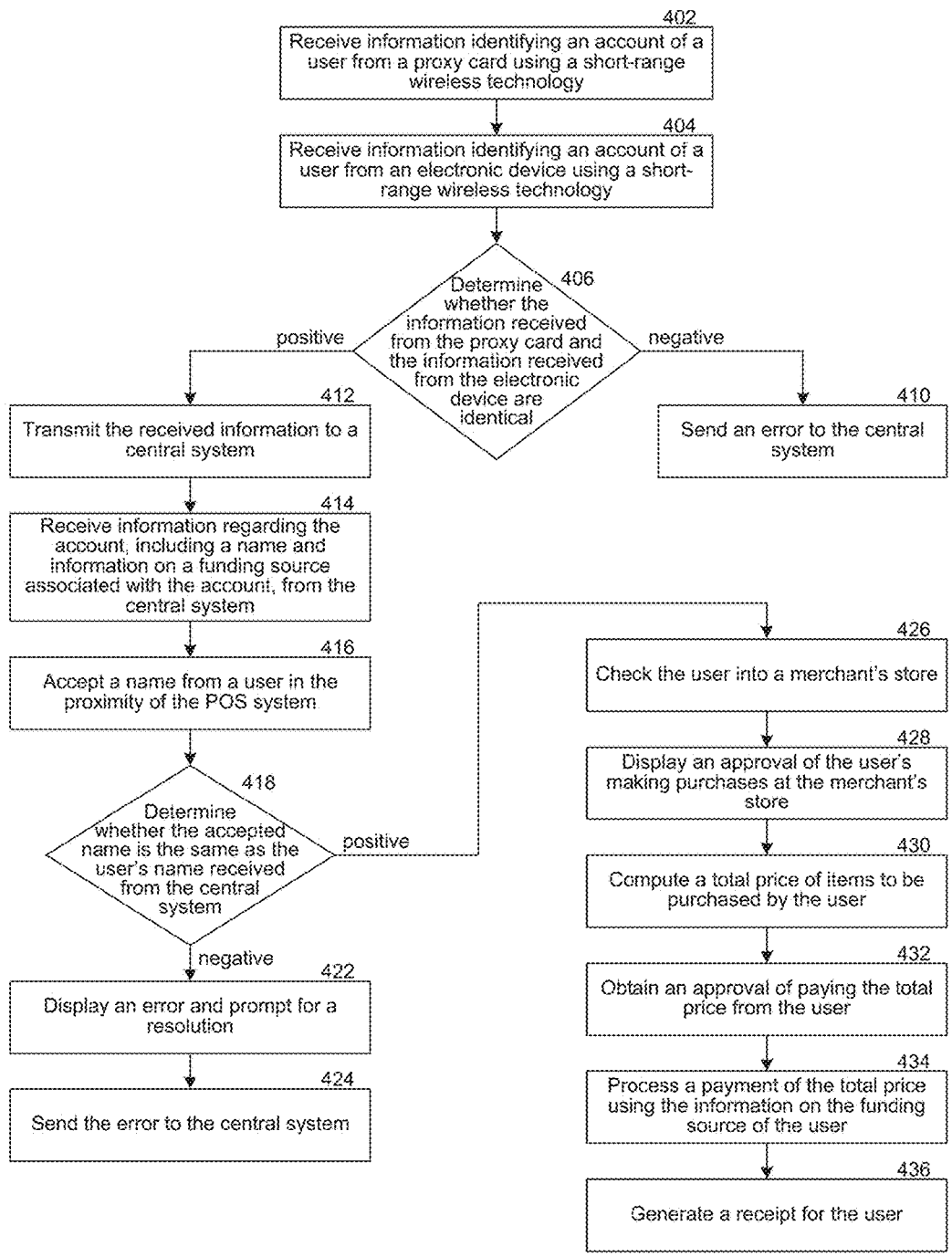
FIG. 4 is a flow diagram illustrating an example process of a pay-by-name purchase performed by a point-of-sale (POS) system of a merchant, which supports a short-range wireless technology and communicates with a server system which manages consumer accounts.

FIG. 4 is a flow diagram illustrating an example pay-by-name purchase process performed by a POS system of a merchant, which supports a short-range wireless technology and communicates with a server system which manages consumer accounts. This process may be used in conjunction with the process in FIGS. 2 and 3. When a consumer carrying a payment card and an electronic device, both of which store information identifying an account of the consumer with the server system, stands near the POS system ready to pay for intended purchases from the merchant, the POS system is ready to receive information from both the payment card and the electronic device. Therefore, in step 402, the POS system receives information identifying an account of a consumer with the server system from the payment card using the short-range wireless technology. In step 404, the POS system receives information identifying an account of a consumer with the server system from the electronic device using the short-range wireless technology. It may receive information from the two sources in either order.

In step 406, the POS system determines whether the two pieces of information received respectively from the payment card and the electronic device are identical. When it determines that the two pieces of information are identical, which is an indication that the payment card and the electronic device are both with a consumer in the proximity of the POS system, in step 412, the POS system transmits either piece of information identifying an account of a consumer to the server system through a network. In step 414, the POS system then receives information regarding the account of the consumer from the server system, including a name and information on a funding source associated with the account. Next, in step 416, the POS system accepts a name provided by a consumer in the proximity of the POS system, usually standing in front of it.

In step 418, the POS system determines whether the given name matches the name obtained based on information received from the payment card and the electronic device. Note that the term "match", as used herein, does not necessary imply identicality of the two things being compared (though that may be the case in some implementations). Rather, it means that at least some predefined minimum degree of similarity is found to exist between the two things being compared. So for example, in some implementations the name "John Smith" might be deemed to match the name "John W. Smith". When it determines that the two names match, which is an indication that the account identified by the payment card and the electronic device belongs to the consumer carrying the two items, in step 426, the POS system checks-in the consumer to the merchant's store. Then, in step 428, the POS system displays an approval of the consumer's making purchases at the merchant's store so that the merchant may proceed to process the consumer's intended purchases. The POS system may then scan the items to be purchased and, in step 430, calculate a total price of those items. In step 432, the POS system obtains an approval from the consumer for paying the calculated total price. In step 434, the POS system then processes a payment of the total price for the items using the information on the funding source of the consumer as provided by the server system. In step 436, the POS system then generates a receipt for the consumer, thus completing the pay-by-name experience of the consumer without the consumer having to take out the payment card or the electronic device.

On the other hand, when it determines that the accepted name does not match the name obtained based on information received from the payment card and the electronic device, in step 422, the POS system displays an error indication, prompting the merchant for a resolution. In step 424, the POS system also sends the error indication to the server system. In addition, when it determines that the two pieces of information received respectively from the payment card and the electronic device are different, in step 410, the POS system sends an error notification to the server system. The POS system may also display the error indication and prompt the merchant for a resolution.

Figure 5:
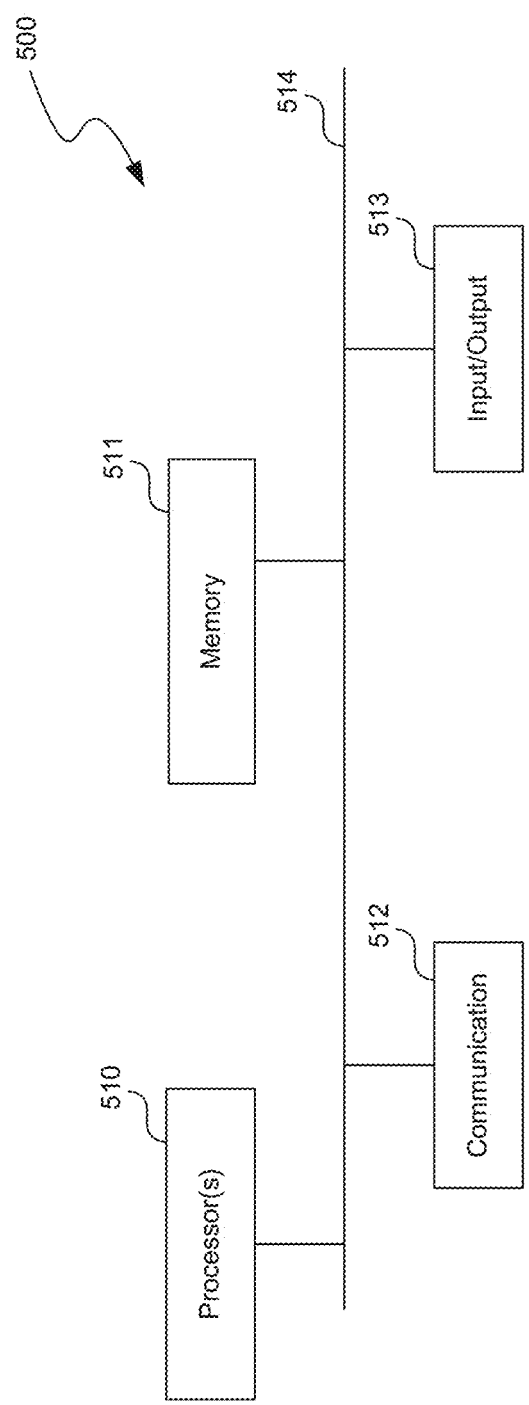
FIG. 5 is a high-level block diagram showing an example of a processing device that can represent any of the devices described above, including a payment card, an electronic device, a POS system or a server system.

FIG. 5 is a high-level block diagram showing an example of a processing device 500 that can represent any of the devices described above, such as a POS system, a server system, a payment card, or an electronic device of a consumer. Any of these systems may include two or more processing devices such as represented in FIG. 5, which may be coupled to each other via a network or multiple networks.

In the illustrated embodiment, the processing system 500 includes one or more processors 510, memory 511, a communication device 512, and one or more input/output (I/O) devices 513, all coupled to each other through an interconnect 514. In some embodiments, the processing system 500 may not have any I/O devices 513. The interconnect 514 may be or include one or more conductive traces, buses, point-to-point connections, controllers, adapters and/or other conventional connection devices. The processor(s) 510 may be or include, for example, one or more general-purpose programmable microprocessors, microcontrollers, application specific integrated circuits (ASICs), programmable gate arrays, or the like, or a combination of such devices. The processor(s) 510 control the overall operation of the processing device 500. Memory 511 may be or include one or more physical storage devices, which may be in the form of random access memory (RAM), read-only memory (ROM) (which may be erasable and programmable), non-volatile memory such as flash memory, miniature hard disk drive, or other suitable type of storage device, or a combination of such devices. Memory 511 may store data and instructions that configure the processor(s) 510 to execute operations in accordance with the techniques described above. The communication device 512 may be or include, for example, an Ethernet adapter, cable modem, Wi-Fi adapter, cellular transceiver, Bluetooth or BLE transceiver, an infrared transceiver, or the like, or a combination thereof. For a POS system, a payment card or an electronic device of a consumer, the communication device 512 supports at least one technology for short-range location detection. Depending on the specific nature and purpose of the processing device 500, the I/O devices 513 can include devices such as a display (which may be a touch screen display), audio speaker, keyboard, mouse or other pointing device, microphone, camera, etc.

Unless contrary to physical possibility, it is envisioned that (i) the methods/steps described above may be performed in any sequence and/or in any combination, and that (ii) the components of respective embodiments may be combined in any manner.

The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Although the present invention has been described with reference to specific exemplary embodiments, it will be recognized that the invention is not limited to the embodiments described but can be practiced with modification and alteration within the spirit and scope of the appended claims. Accordingly, the specification and drawings are to be regarded in an illustrative sense rather than a restrictive sense.

What is claimed is:

1. A method performed by a personal mobile communication device, the method comprising:
receiving, by an application executing on the personal mobile communication device storing information identifying a financial account on a server system, a request to send the information identifying the financial account to a point-of-sale (PSO) system via the application, wherein the request is received from a payment card associated with the personal mobile communication device via a short-range wireless communication link;
determining, by the personal mobile communication device, that the POS system is in proximity to the personal mobile communication device;

receiving, by the application executing on the personal mobile communication device, information identifying a merchant from the POS system;

determining, by the personal mobile communication device, location information for the personal mobile communication device;

determining, by the personal mobile communication device, whether the POS system is associated with the merchant based on a comparison of the information identifying the merchant and the location information for the personal mobile communication device; and in response to a first determination result indicating that the POS system is associated with the merchant, causing delivery of the information identifying the financial account to the POS system.

2. The method of claim 1, wherein the determining whether the POS system is associated with the merchant, further comprises:

identifying a current location from the location information for the personal mobile communication device;

identifying an official location of the merchant using the information identifying the merchant; and determining whether the identified current location and the identified official location match.

3. The method of claim 2, further comprising:

in response to a second determination result indicating that the identified current location and the identified official location match, sending a confirmation of the delivery to the payment card; and in response to the second determination result indicating that the identified current location and the identified official location do not match, sending an error notification to the payment card.

4. The method of claim 2, wherein the current location is identified by using a built-in Global Positioning System (GPS) feature.

5. The method of claim 2, wherein the official location of the merchant is identified by contacting the server system or by searching the web.

6. The method of claim 1, wherein the personal mobile communication device is a phone, a laptop computer, a tablet computer, a watch, eyewear, a personal digital assistant, or a camera.

7. The method of claim 1, wherein the short-range wireless communication link is Bluetooth Low Energy (BLE), Bluetooth, Wi-Fi, Near Field Communication (NFC), or Radio-Frequency Identification (RFID).

8. The method of claim 1, wherein after the delivery of the information identifying the financial account to the POS system, the POS system and the payment card process a transaction based on the financial account.

9. The method of claim 1, wherein the determining whether the POS system is associated with the merchant is further based on a method of payment accepted by the POS system.

10. The method of claim 1, wherein the determining whether the POS system is associated with the merchant further comprises determining whether the POS system is capable of accepting the payment card associated with the personal mobile communication device.

11. The method of claim 1, wherein the application executing on the personal mobile communication device is downloaded from the server system.

12. The method of claim 1, wherein the request is received based on a detection that the personal mobile communication device is in a particular proximity to the payment card.

* * * * *